(12) United States Patent
Alexander et al.

(10) Patent No.: US 8,789,314 B2
(45) Date of Patent: Jul. 29, 2014

(54) ACTIVE SEAL ARCHITECTURES

(75) Inventors: Paul W. Alexander, Ypsilanti, MI (US);
Diann Brei, Milford, MI (US);
Jonathan E. Luntz, Ann Arbor, MI
(US); Monica Cristina Toma, Ann
Arbor, MI (US); Alan L. Browne,
Grosse Pointe, MI (US); **Nancy L.
Johnson**, Northville, MI (US)

(73) Assignees: **GM Global Technology Operations
LLC, Detroit, MI (US); The Regents of
the University of Michigan**, Ann Arbor,
MI (US)

( * ) Notice: Subject to any disclaimer, the term of this patent is extended or adjusted under 35 U.S.C. 154(b) by 491 days.

(21) Appl. No.: 12/420,144

(22) Filed: Apr. 8, 2009

(65) Prior Publication Data
US 2009/0255187 A1 Oct. 15, 2009

Related U.S. Application Data

(60) Provisional application No. 61/043,912, filed on Apr. 10, 2008.

(51) Int. Cl.
*E06B 7/205* (2006.01)

(52) U.S. Cl.
USPC ....... 49/477.1; 49/475.1; 49/480.1; 49/498.1; 49/502

(58) Field of Classification Search
USPC ............... 49/475.1, 477.1, 480.1, 498.1, 502
See application file for complete search history.

(56) References Cited

U.S. PATENT DOCUMENTS

| | | | | |
|---|---|---|---|---|
| 5,046,285 A * | 9/1991 | Fratini et al. | ................. | 49/477.1 |
| 5,143,772 A * | 9/1992 | Iwasa | ............................. | 428/122 |
| 5,390,974 A * | 2/1995 | Theodorakakos | ......... | 296/146.9 |
| 5,395,126 A * | 3/1995 | Tresslar | ........................ | 277/637 |
| 5,979,828 A * | 11/1999 | Gruensfelder et al. | .... | 244/129.1 |
| 6,009,669 A * | 1/2000 | Jardine et al. | .................. | 49/316 |
| 6,098,992 A * | 8/2000 | Long et al. | ..................... | 277/637 |
| 6,119,404 A * | 9/2000 | Bschorr et al. | .............. | 49/498.1 |
| 6,702,301 B1 * | 3/2004 | Davies et al. | ................. | 277/646 |
| 7,258,347 B2 * | 8/2007 | Keefe et al. | .................... | 277/628 |
| 2004/0145213 A1 | 7/2004 | Watanabe | | |
| 2005/0198907 A1 * | 9/2005 | McKnight et al. | ........... | 49/475.1 |
| 2005/0199440 A1 * | 9/2005 | Keefe et al. | .................... | 181/284 |
| 2005/0206096 A1 * | 9/2005 | Browne et al. | ................ | 277/628 |

* cited by examiner

*Primary Examiner* — Katherine Mitchell
*Assistant Examiner* — Marcus Menezes
(74) *Attorney, Agent, or Firm* — Reising Ethington P.C.

(57) ABSTRACT

Active seal architectures adapted for producing a variable sealing and/or closing force between a closure panel and perimeter, includes a mounting clip, a flexible outer layer fixedly connected to the clip, defining an interior space, and longitudinally extending along the perimeter; and an interior structure comprising and reconfigurable by an active material disposed within the space, and operable to impart differing first and second forces upon the layer and panel when the material is activated and deactivated respectively.

15 Claims, 13 Drawing Sheets

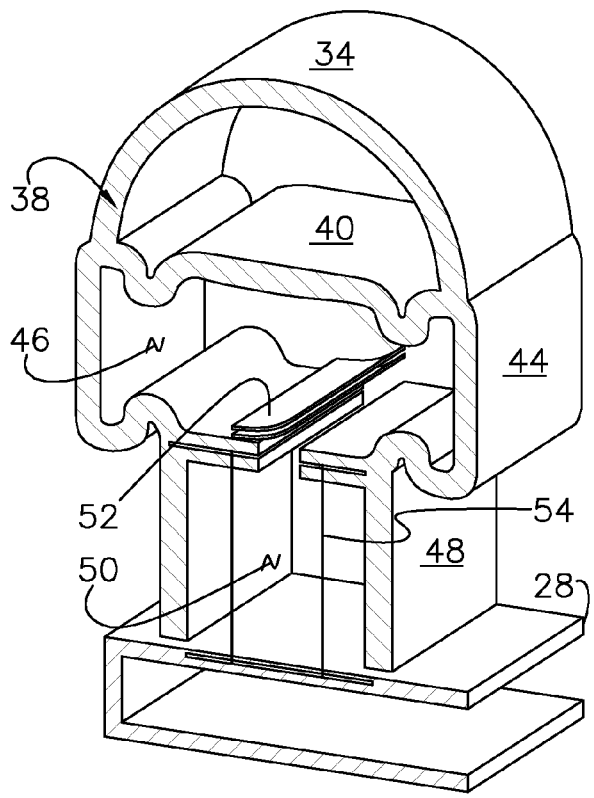
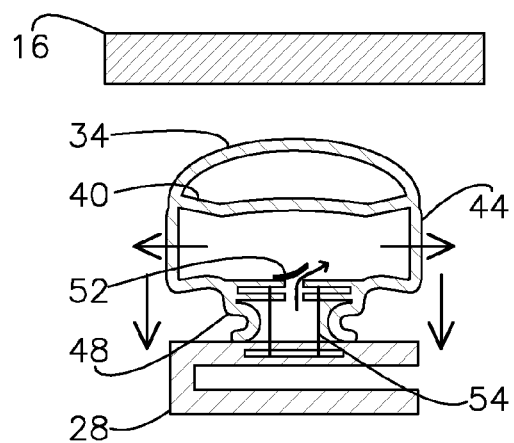
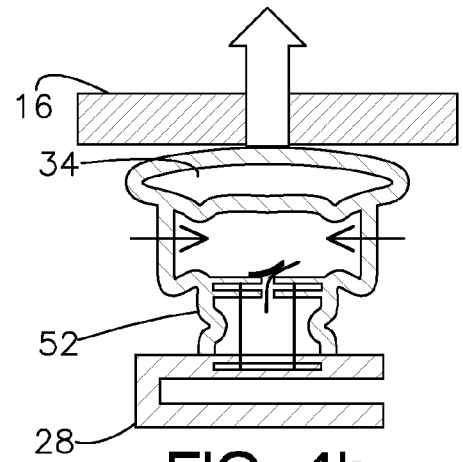
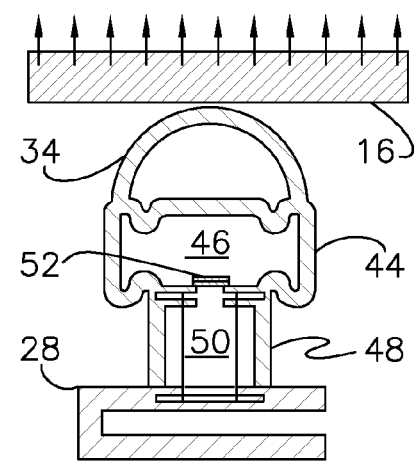
FIG. 4
FIG. 4a
FIG. 4b
FIG. 4c

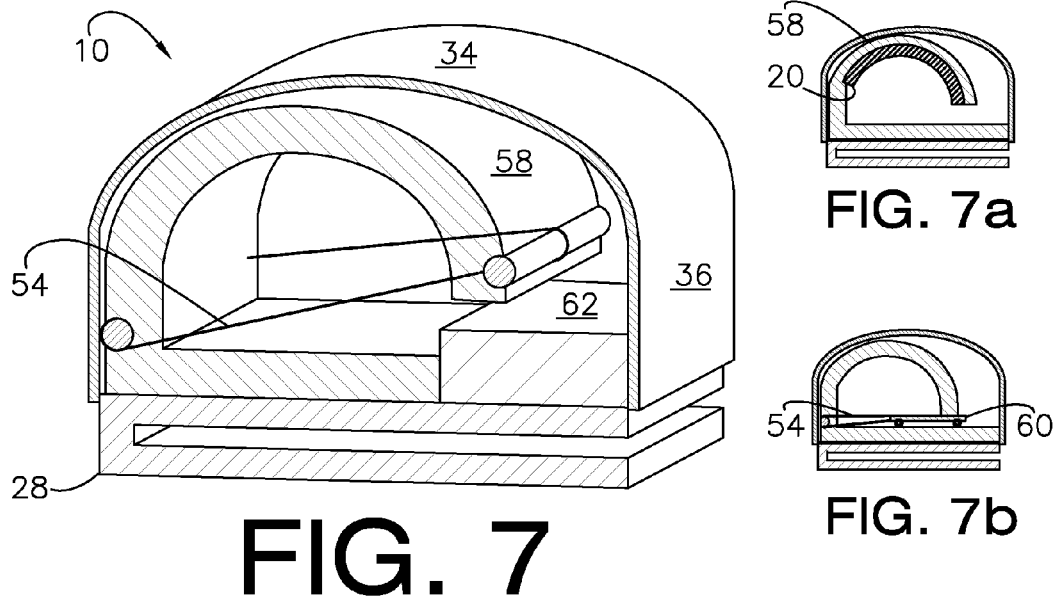
FIG. 7
FIG. 7a
FIG. 7b
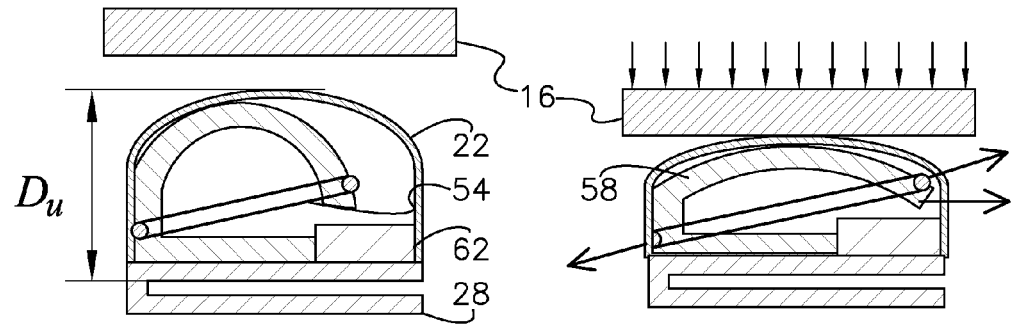
FIG. 7c
FIG. 7d
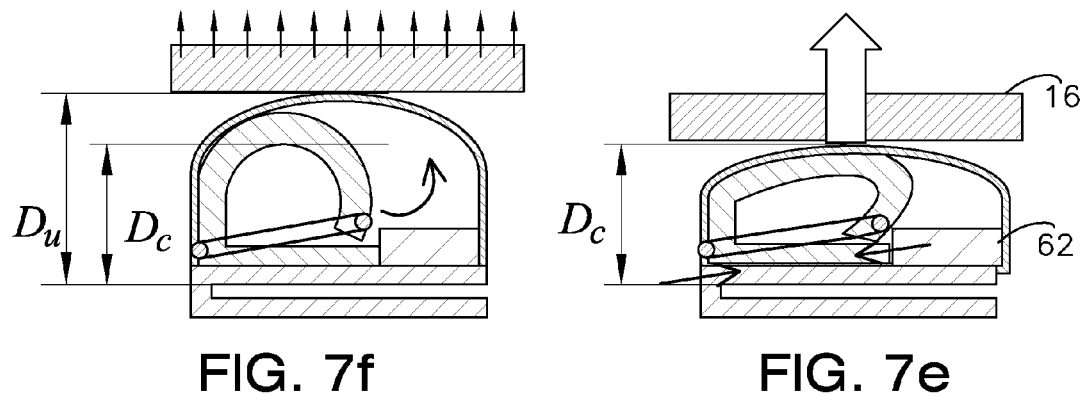
FIG. 7f
FIG. 7e

FIG. 10
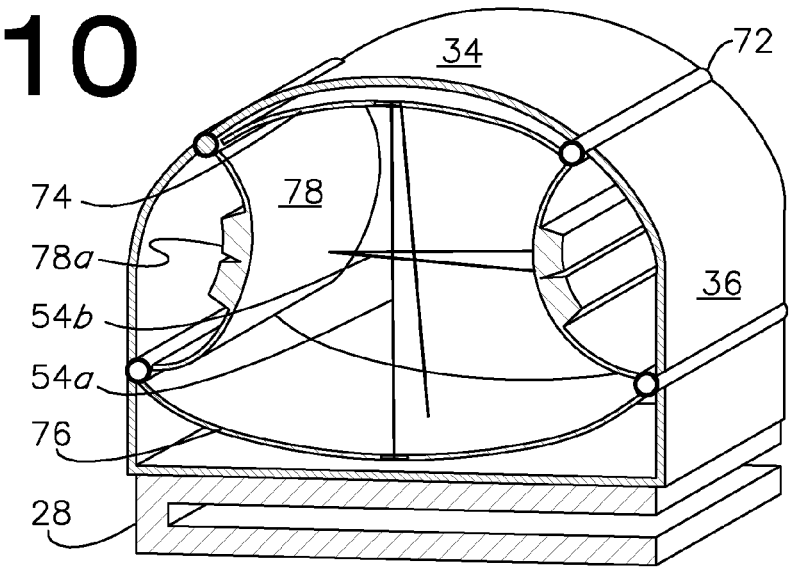
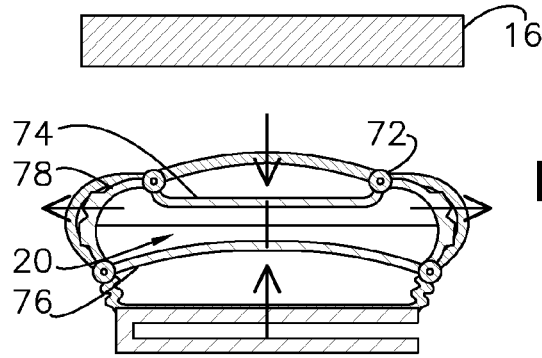
FIG. 10a
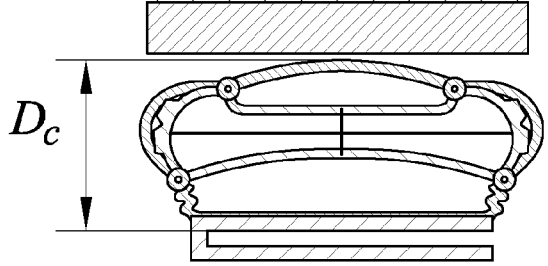
FIG. 10b
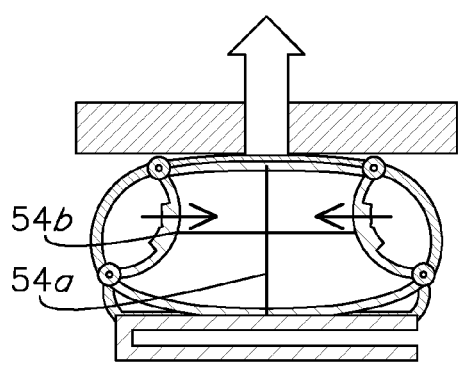
FIG. 10c

FIG. 11
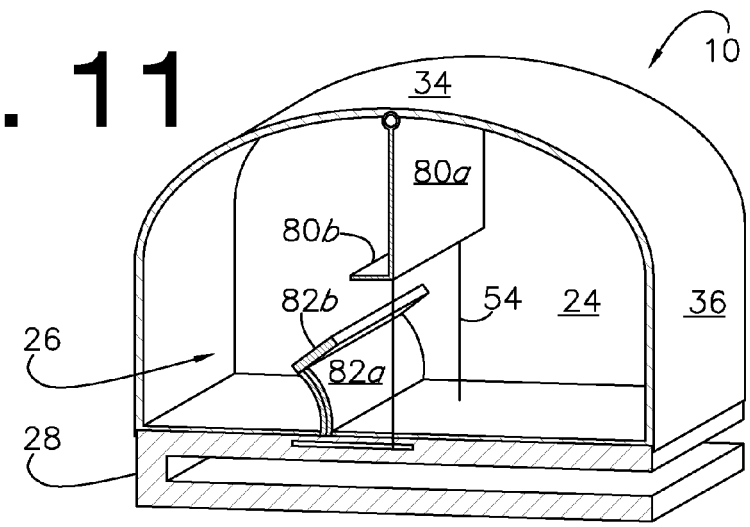
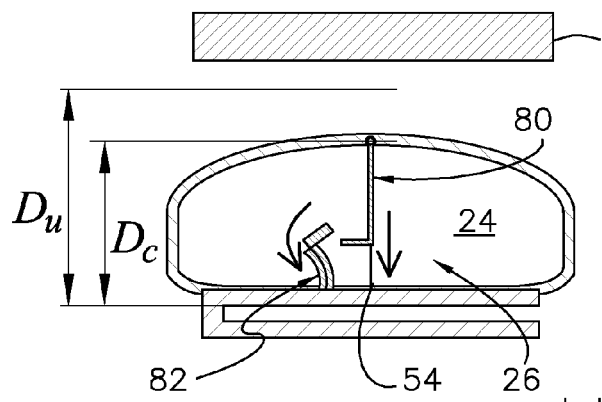
FIG. 11a
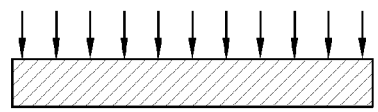
FIG. 11b
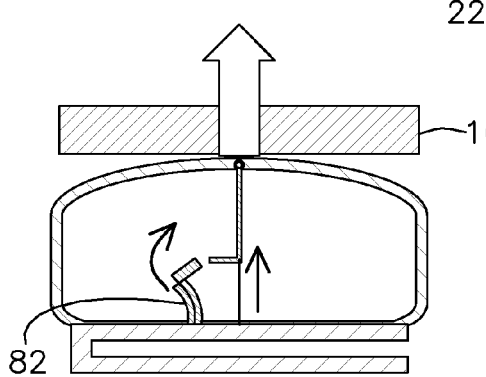
FIG. 11c

ACTIVE SEAL ARCHITECTURES

RELATED APPLICATIONS

This patent application claims priority to, and benefit from U.S. Provisional Patent Application Ser. No. 61/043,912, entitled "ACTIVE SEAL ASSEMBLIES AND METHODS," filed on Apr. 10, 2008, the disclosure of which is incorporated by reference herein.

BACKGROUND OF THE INVENTION

1. Field of the Invention

The present disclosure generally relates to compressible seals, such as the type intermediate a door and doorframe; and more particularly, to seal architectures that employ active material actuation to selectively reduce/increase the sealing force.

2. Discussion of Prior Art

Current methods and assemblies for sealing opposing surfaces such as doors and trunk lids, for example, include the use of flexible elastic membranes and structures that compress upon pressing contact of one component against another. Because of this, to provide effective sealing engagement, closure force must be sufficient to overcome any compressive forces associated with the seal assembly. Typical materials employed for seal assemblies are passive materials and generally include various forms of elastomers, e.g., foams and solids, that are formed into structures having solid and/or hollow cross sectional structures. The geometries of the cross sections are varied and may range from circular forms to irregular forms having multiple cavities, channels, slots and/or extending vanes.

Sealing assemblies are typically utilized for sound, airflow, and/or fluid management. The seals generally are exposed to a variety of conditions. For example, for vehicle applications, door seals generally are exposed to a wide range of environmental conditions such as rain, snow, sun, humidity and temperature conditions, and the like. As noted above, current materials utilized for automotive seals are generally passive. That is, other than innate changes in the modulus properties of the seal material due to aging and environmental stimuli, the stiffness and cross sectional geometries of the seal assemblies cannot be remotely changed or controlled on demand.

Of concern, conventional passive seals present a tradeoff between seal effectiveness and closure effort. That is to say, increasing the interface pressure and/or contact area of the seal can generally increase seal effectiveness; however, in sealing applications, such as in vehicle doors, the increased interface pressure and/or contact area by passive seal assemblies generally results in increased door opening and closing efforts.

Accordingly, it is desirable to have active material based seal assemblies that can be controlled and remotely changed to alter the seal effectiveness, wherein the active seal assemblies change stiffness properties on demand, for example, by changing the material's elastic modulus, or geometry by actively changing the cross-sectional shape of the seal structure. In this manner, in seal applications such as the vehicle door application noted above, door opening and closing efforts can be minimized yet seal effectiveness can be maximized by actively manipulating the seal properties.

BRIEF SUMMARY

Responsive to this concern, this invention relates to active material seal architectures adapted to selectively vary (i.e., decrease or increase) sealing force. As such, this invention is useful for preventing or mitigating the migration of noise, water or the like, and for facilitating the opening and/or closing of a closure panel. More particularly, the present invention is useful for providing tailorable seal geometry and/or stiffness characteristics, which improve seal performance across the full spectrum of the duty cycle. The invention is useful for maintaining sealing pressure/force during normal vehicle operation with minimal to no power consumption and reducing seal interference and closing effort when manipulating the panel due to a reduction in air-bind. With respect to the latter, the invention is useful for selectively reducing the seal height, which allows more air to escape the confined space (e.g., vehicle cabin), thereby reducing the force necessary to reach the latch once the panel engages the seal.

The benefits provided variously by the presented architectures further include mitigating the need for secondary/tertiary seals, a low risk to fail required performance, a high sealing force in failure, and low holding power. Finally, the invention is useful for providing active material actuation that presents advantages (e.g., lower costs, reduced operating noise, increased packaging flexibility, etc.) over conventional electromechanical actuators, such as motors, and in one embodiment provides a single actuator for increasing the sealing force and latching the seal.

Thus, the invention generally recites an active seal adapted to produce a variable sealing force, and for use with an opening defining a perimeter and a closure panel configured to engage the perimeter is provided. The seal includes a mounting clip, a flexible outer layer fixedly connected to the clip, defining an interior space, and longitudinally extending along the perimeter, and an interior structure. The novel structure comprises at least one active material element, presenting longitudinal and lateral profiles, and configured to impart a first force upon the layer or produce a first stiffness when the element is deactivated, and a second force upon the layer or second stiffness when activated.

The disclosure is further understood by reference to the following detailed description of the various embodiments of the disclosure and the appendices attached hereto.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 4 is a perspective view of an active seal segment including a flexible outer layer, rigid clip, an internal structure defining a dual chamber architecture, and an active material valve and element disposed within the layer, in accordance with a preferred embodiment of the invention;

FIG. 4a is an elevation of the seal shown in FIG. 4, wherein the associated panel is opened, and the element has been activated so as to collapse the lower and widen the upper chamber;

FIG. 4b is an elevation of the seal shown in FIG. 4, wherein the panel is closed, the element has been deactivated and the valve has been activated, so as to cause the layer to push against the panel;

FIG. 4c is an elevation of the seal shown in FIG. 4, wherein the panel is opening, and the seal has returned to the original condition;

FIG. 7 is a perspective view of an active seal segment including a flexible outer layer, rigid clip, an internal structure including a laterally cantilevered flange arch, an obstruction shelf, and an active material element presenting a webbing and drivenly coupled to the free end of the flange, in accordance with a preferred embodiment of the invention;

FIG. 7a is an elevation of the seal shown in FIG. 7, wherein the element presents a superjacent arcuate layer attached to the flange, in accordance with a preferred embodiment of the invention;

FIG. 7b is an elevation of the seal shown in FIG. 7, wherein the element is drivenly coupled to a sliding plate in communication with the free end of the flange, in accordance with a preferred embodiment of the invention;

FIG. 7c is an elevation of the seal shown in FIG. 7, wherein the associated panel is opened, and the element is deactivated, so that the flange presents a relaxed bowed state;

FIG. 7d is an elevation of the seal shown in FIG. 7, wherein the panel is closing and engages the seal, and the flange is caused to flatten and the element to expand as a result of the panel engaging the layer;

FIG. 7e is an elevation of the seal shown in FIG. 7, wherein the panel is closed, and the element has been activated so as to pull the free end of the flange inwardly past the obstruction shelf;

FIG. 7f is an elevation of the seal shown in FIG. 7, wherein the panel is opening, and the seal has returned to the original condition;

FIG. 10 is a perspective view of an active seal segment including a flexible outer layer, rigid clip, an internal structure presenting a bistable double arch architecture including upper, lower, and lateral arches, and horizontal and vertical active material elements drivenly coupling opposing arches, in accordance with a preferred embodiment of the invention;

FIG. 10a is an elevation of the seal shown in FIG. 10, wherein the associated panel is opened, and the vertical element is activated, so that the layer is caused to flatten;

FIG. 10b is an elevation of the seal shown in FIG. 10, wherein the panel is closing and engages the seal, and the vertical element is deactivated but remains in the bi-stable configuration;

FIG. 10c is an elevation of the seal shown in FIG. 10, wherein the panel is closed, and the horizontal element has been activated so as to pull the lateral arches inwardly, and cause the layer to push up against the panel;

FIG. 11 is a perspective view of an active seal segment including a flexible outer layer, rigid clip, an internal structure presenting an electrode, active bender actuator, and an active material element drivenly coupled to the electrode, in accordance with a preferred embodiment of the invention;

FIG. 11a is an elevation of the seal shown in FIG. 11, wherein the associated panel is opened, and the bender and element are activated, so that the layer is caused to flatten;

FIG. 11b is an elevation of the seal shown in FIG. 11, wherein the panel is closing and engages the seal, and the bender and element are deactivated so that the bender catches the electrode and the layer remains flattened;

FIG. 11c is an elevation of the seal shown in FIG. 11, wherein the panel is closed, and the bender is activated so as to allow the layer to push up against the panel;

DETAILED DESCRIPTION

Figure 1:
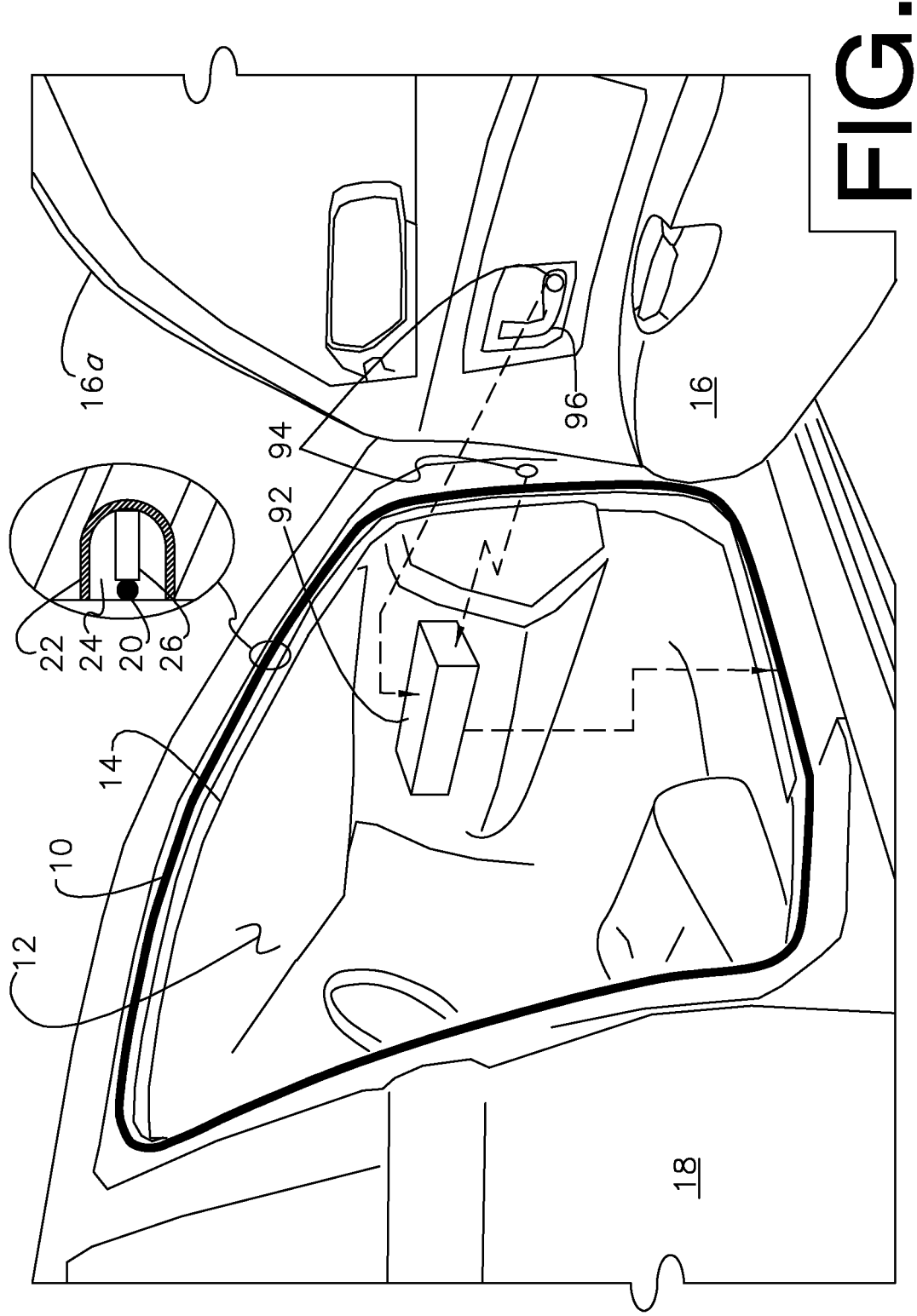
FIG. 1 is a partial elevation of a vehicle, particularly illustrating the front passenger door ajar, an active seal aligning the perimeter of the door opening, and a controller and sensor in operative communication with the seal, in accordance with a preferred embodiment of the invention.

The present invention concerns an active seal 10 adapted for use with an opening 12 defining a perimeter 14, and with a closure panel 16 selectively engaging the perimeter 14, so as to overlay the opening 12 (FIG. 1). The seal 10 forms a compressible and preferably continuous and impermeable barrier between the perimeter 14 and panel 16, when the opening 12 is closed. In an automotive setting, the panel 16 may compose a door, deck lid, sliding sun roof, or hood of a vehicle 18; however, it is certainly appreciated that the benefits of the present invention may be employed where ever improved sealing and selective variation of sealing force is desirous. As shown in FIG. 1, for example, the seal 10 may be fixedly secured in a recess circumscribing and defining a vehicle door opening 12; the door 16 is configured to overlay the opening 12 and engage the seal 10 when in the closed condition. In this condition, the seal 10 generates opposite and equal sealing force upon the door 16 and vehicle 18. Alternatively, it is appreciated that the inventive seal 10 may be door-mounted.

In the present invention, the seal 10 is operable to selectively vary the sealing force (e.g., when the door 16 is closed and/or opened). In general, the inventive seal 10 includes an active material element 20, a flexible outer layer 22 defining an interior space 24, and an interior structure 26 that is drivenly coupled to the layer 22 and employs active material means. That is to say, the interior structure 26 comprises and/or is communicatively coupled to the active material element 20 and is connected to or otherwise configured to engage the outer layer 22. The structure 26 is operable to impart a first force upon the layer 22 when the element 20 is deactivated, and a second force substantially (e.g., 10%, more preferably, 25%, and most preferably 50%) different than the first upon the layer 22 when activated. Alternatively, the structure 26 may present first and second stiffnesses, when activated and deactivated respectively. In FIGS. 2-13b, a singular layer 22 is depicted for ease of illustration; however, it is appreciated that the layer 22 may include extra bulbs, layers, flanges, etc. or other non-planar configurations.

I. Active Material Description and Functionality

As used in the present invention, the term "active material" shall mean any material or composite that undergoes a reversible fundamental (e.g., intensive physical, chemical, etc.) property change when activated by an external stimulus or signal, as this term is understood and defined by those of ordinary skill in the art. Among other ways, the change in property may manifest as one of dimension, shape, orientation, shear force, or flexural modulus upon application of the activation signal. Suitable active materials include, without limitation, shape memory alloys (SMA), ferromagnetic shape memory alloys, electroactive polymers (EAP), piezoelectric materials, magnetorheological elastomers, electrorheological elastomers, thin films of composites formed between poly (vinylidene fluoride) (PVDF) and lead zirconium titanate (PZT), and the like.

Depending on the particular active material, the activation signal can take the form of, without limitation, an electric current, an electric field (voltage), a temperature change, a magnetic field, a mechanical loading or stressing, and the like. For example, a magnetic field may be applied for changing the property of the active material fabricated from magnetostrictive materials. A heat signal may be applied for changing the property of thermally activated active materials such as Martensitic SMA. An electrical signal may be applied for changing the property of the active material fabricated from electroactive materials, piezoelectrics, and/or ionic polymer metal composite materials.

Desirably, the change in the property of the active material remains for the duration of the applied activation signal. In one embodiment, upon discontinuation of the activation signal, the property of the active material generally reverts to an unpowered form and returns substantially to its original property. As used herein, the term "return mechanism" generally refers to any component capable of providing a force opposite to a force provided by the active material, and includes, without limitation, springs, elastomers, additional active materials, and the like. In this manner, reversibility and multiple deployments of the flow trip can advantageously occur.

Subdivisions and/or combinations of active material can provide additional desirable benefits, such as improved package size, reduced weight, increased design scalability, larger angular displacements or torques, a digital or step-like actuation, a stacked or staggered actuation to improve controllable resolution, an active reset spring, or differential actuation via antagonistic wire configurations. For tailored force and displacement performance of the active material, the subdivisions may be directly anchored by a mechanical anchor. From this mechanical reference though, the active material subdivisions may be configured electrically or mechanically in series or parallel and mechanically connected in telescoping, stacked, or staggered configurations. The electrical configuration may be modified during operation by software timing, circuitry timing, and external or actuation induced electrical contact.

SMA exists in several different temperature-dependent phases. The most commonly utilized of these phases are the so-called Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature (As). The temperature at which this phenomenon is complete is called the Austenite finish temperature (Af). When the shape memory alloy is in the Austenite phase and is cooled, it begins to change into the Martensite phase, and the temperature at which this phenomenon starts is referred to as the Martensite start temperature (Ms). The temperature at which Austenite finishes transforming to Martensite is called the Martensite finish temperature (Mf). Generally, SMA elements are softer and more easily deformable in their Martensitic phase and are harder, stiffer, and/or more rigid in the Austenitic phase. In view of the foregoing properties, expansion of the shape memory alloy is preferably at or below the Austenite transition temperature (at or below As). Subsequent heating above the Austenite transition temperature causes the expanded shape memory alloy to revert back to its permanent shape. Thus, a suitable activation signal for use with SMA is a thermal activation signal having a magnitude to cause transformations between the Martensite and Austenite phases.

The temperature at which the SMA remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate.

Ferromagnetic Shape Memory Alloys (FSMA) are a subclass of SMA. FSMA can behave like conventional SMA materials that have a stress or thermally induced phase transformation between Martensite and Austenite. Additionally FSMA are ferromagnetic and have strong magnetocrystalline anisotropy, which permit an external magnetic field to influence the orientation/fraction of field aligned Martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for latching-type applications where a delayed return stimulus permits a latching function. External magnetic fields are generally produced via soft-magnetic core electromagnets in automotive applications, though a pair of Helmholtz coils may also be used for fast response.

Exemplary ferromagnetic shape memory alloys are nickel-manganese-gallium based alloys, iron-platinum based alloys, iron-palladium based alloys, cobalt-nickel-aluminum based alloys, cobalt-nickel-gallium based alloys. Like SMA these alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range and the type of response in the intended application.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that it has a maximum elastic modulus of about 100 MPa. In another embodiment, the polymer is selected such that it has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

It is appreciated that piezoelectric ceramics can also be employed to produce force or deformation when an electrical charge is applied. PZT ceramics consists of ferroelectric and quartz material that are cut, ground, polished, and otherwise shaped to the desired configuration and tolerance. Ferroelectric materials include barium titanate, bismuth titanate, lead magnesium niobate, lead metaniobate, lead nickel niobate, lead zinc titanates (PZT), lead-lanthanum zirconate titanate (PLZT) and niobium-lead zirconate titanate (PNZT). Electrodes are applied by sputtering or screen printing processes, and then the block is put through a poling process where it takes on macroscopic piezoelectric properties. Multi-layer piezo-actuators typically require a foil casting process that allows layer thickness down to 20 μm. Here, the electrodes are screen printed and the sheets laminated; a compacting process increases the density of the green ceramics and removes air trapped between the layers. Final steps include a binder burnout, sintering (co-firing) at temperatures below 1100° C., wire lead termination, and poling.

Barium titanates and bismuth titanates are common types of piezoelectric ceramics Modified barium-titanate compositions combine high-voltage sensitivity with temperatures in the range of −10° C. to 60° C. Barium titanate piezoelectric ceramics are useful for hydrophones and other receiving devices. These piezoelectric ceramics are also used in low-power projectors. Bismuth titanates are used in high temperature applications, such as pressure sensors and accelerometers. Bismuth titanate belongs to the group of sillenite structure-based ceramics ($Bi_{12}MO_20$ where M=Si, Ge, Ti).

Lead magnesium niobates, lead metaniobate, and lead nickel niobate materials are used in some piezoelectric ceramics. Lead magnesium niobate exhibits an electrostrictive or relaxor behavior where strain varies non-linearly. These piezoelectric ceramics are used in hydrophones, actuators, receivers, projectors, sonar transducers, and in micropositioning devices because they exhibit properties not usually present in other types of piezoelectric ceramics. Lead magnesium niobate also has negligible aging, a wide range of operating temperatures and a low dielectric constant. Like lead magnesium niobate, lead nickel niobate may exhibit electrostrictive or relaxor behaviors where strain varies non-linearly.

Piezoelectric ceramics include PZN, PLZT, and PNZT. PZN ceramic materials are zinc-modified, lead niobate compositions that exhibit electrostrictive or relaxor behavior when non-linear strain occurs. The relaxor piezoelectric ceramic materials exhibit a high-dielectric constant over a range of temperatures during the transition from the ferroelectric phase to the paraelectric phase. PLZT piezoelectric ceramics were developed for moderate power applications, but can also be used in ultrasonic applications. PLZT materials are formed by adding lanthanum ions to a PZT composition. PNZT ceramic materials are formed by adding niobium ions to a PZT composition. PNZT ceramic materials are applied in high-sensitivity applications such as hydrophones, sounders and loudspeakers.

Piezoelectric ceramics include quartz, which is available in mined-mineral form and man-made fused quartz forms. Fused quartz is a high-purity, crystalline form of silica used in specialized applications such as semiconductor wafer boats, furnace tubes, bell jars or quartzware, silicon melt crucibles, high-performance materials, and high-temperature products. Piezoelectric ceramics such as single-crystal quartz are also available.

Finally, suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like. Magnetostrictives are commonly termed active materials and yet the relative magnitude of the magnetostrictive effect ranges hugely over the various materials that are lumped in this class, for example "Terfinol" (SP) exhibiting a giant magnetostrictive effect and Galfenol (Sp) exhibiting a "large" magnetostrictive effect.

II. Exemplary Active Seal Architectures and Methods of Use

As shown in the illustrated embodiments (FIGS. 2-13*b*) and further described below, the inventive active seal architecture may include, among other things, a layered stack, dual chambers and a check valve, laterally arching elements, longitudinally arching elements, a rubber flange and webbing, a rubber flange and bent planar object, a rubber flange and sliding plate, a bistable arch, a bistable double arch, a direct latch, a rubber cam and spool actuator, a recurve stack, a torsional core, axially oriented bent objects, other similar geometric configurations, or combinations of the foregoing.

Figure 2:
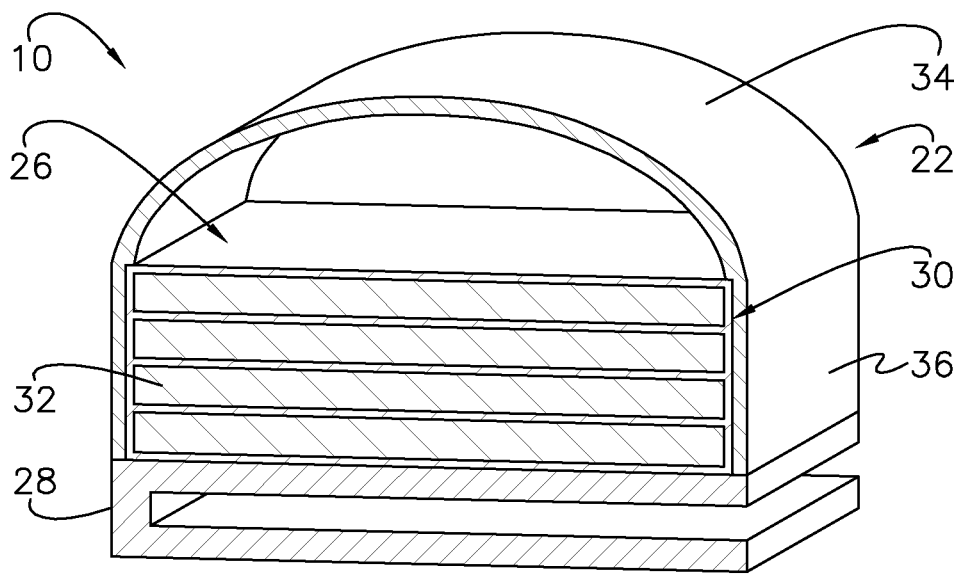
FIG. 2 is a perspective view of an active seal segment including a flexible outer layer, rigid clip, and EAP stack disposed within the layer, in accordance with a preferred embodiment of the invention.
Figure 2A:
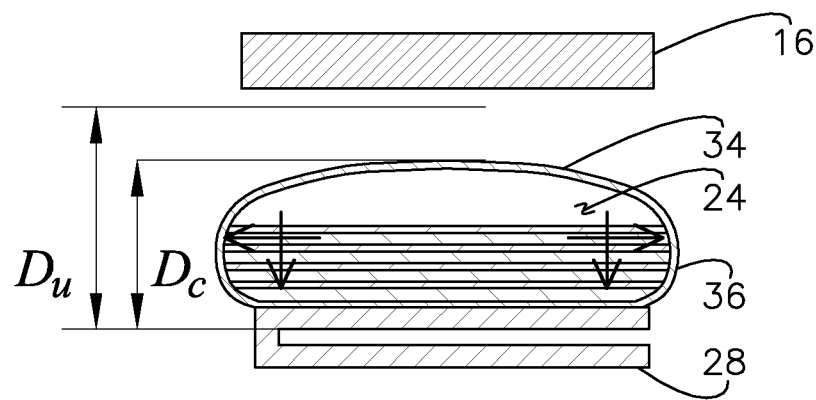
FIG. 2*a* is an elevation of the seal shown in FIG. 2, wherein the associated panel (e.g., door) is opened, and the stack has been activated so as to collapse the layer.
Figure 2B:
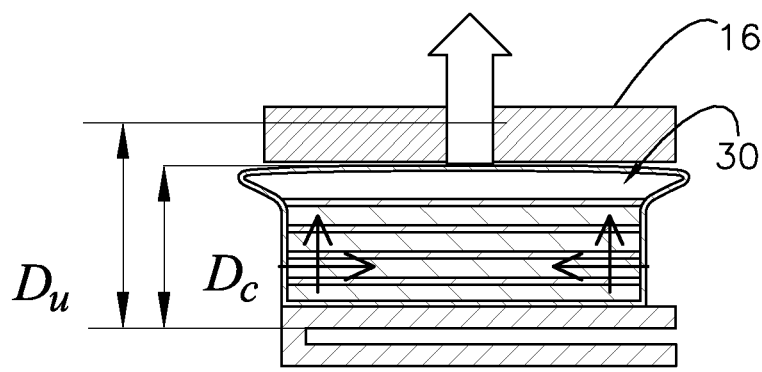
FIG. 2*b* is an elevation of the seal shown in FIG. 2, wherein the panel is closed, and the stack has been deactivated so as to allow the layer to push against the panel, thereby increasing the sealing force.

More particularly, in FIGS. 2-2*b*, the seal 10 includes the flexible outer layer 22, a rigid mounting clip 28, and a triple-acting dielectric (DE) stack 30 consisting, for example, of individual EAP planar members 32. A plurality of four EAP members 32 are shown; however, it is certainly within the ambit of the invention to utilize a greater or lesser plurality. Here, the layer 22 defines a horizontal compliant (e.g. rubber) engaging section 34 in the form of an arch, and vertical side walls 36 that are engaged by the members 32 and generally congruent in height therewith. The flexibility of the layer 22 defines a compliant joint at the connection point of the arch 34 and walls 36 (FIG. 2).

As shown in FIG. 2*a*, when the panel (e.g., door) is opened, the EAP stack 30 may be activated so that the Poisson effect causes the members 32 to push outwardly against the walls 36. This causes the engagement section 34 to flatten and widen resulting in a less stiff configuration, and the seal 10 to compress from a maximum unengaged height ($D_u$) to a compressed height ($D_c$). As a result, a lesser closing force is necessary to close the door because of the reduced stiffness coupled with the reduction in height allowing for more air within the cabin to escape during the closing operation and a reduction in the induced pressure increase seen in the cabin 16. Once closed, and as shown in FIG. 2*b*, the EAP stack 30 is deactivated (or released), such that the walls 36 are drawn inward, and the section 34 and stack 30 are caused to push against the door 16, resulting in greater sealing force.

Figure 3:
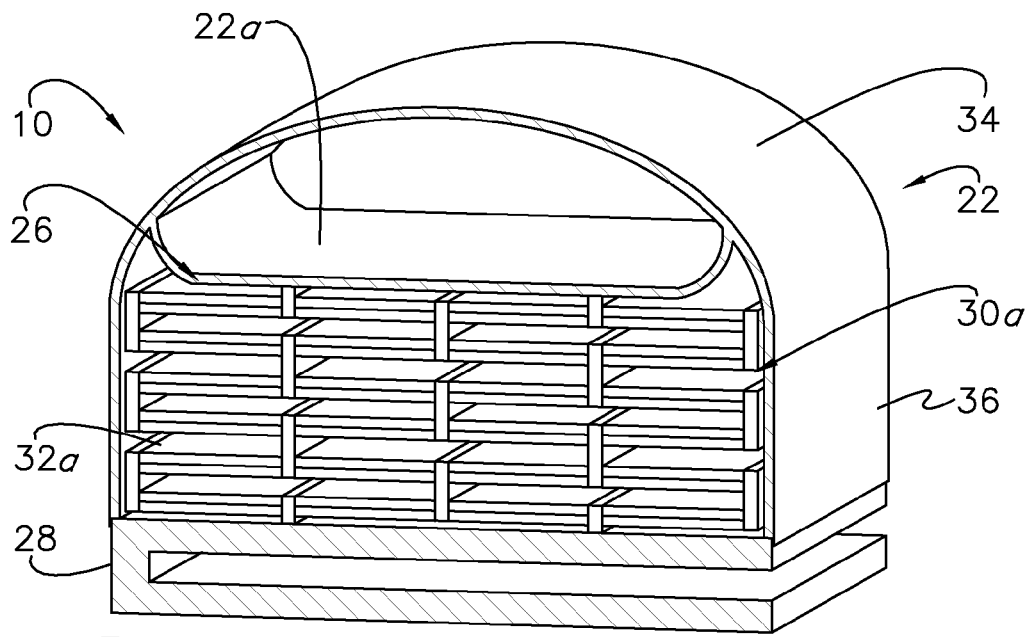
FIG. 3 is a perspective view of an active seal segment including a flexible outer layer, rigid clip, recurve stack and internal membrane interconnecting the stack and layer, in accordance with a preferred embodiment of the invention.
Figure 3A:
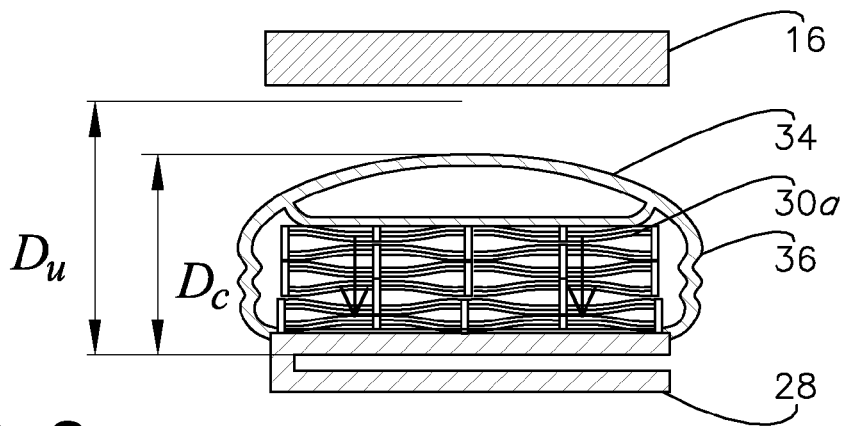
FIG. 3a is an elevation of the seal shown in FIG. 3, wherein the associated panel is opened, and the stack has been activated so as to collapse the layer.
Figure 3B:
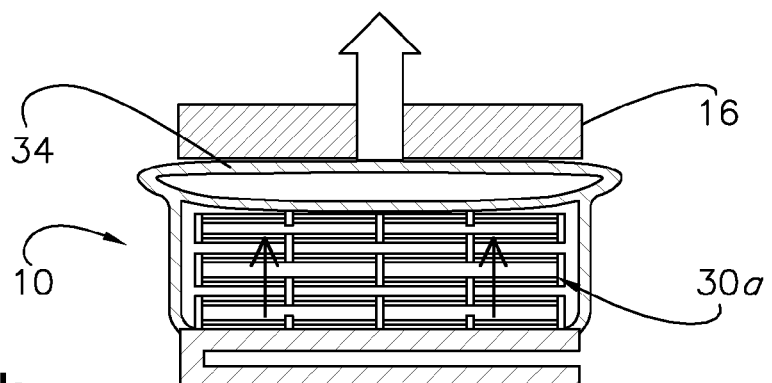
FIG. 3b is an elevation of the seal shown in FIG. 3, wherein the panel is closed, and the stack has been deactivated so as to allow the layer to push against the panel.

Alternatively, it is appreciated that the seal 10 may include a recurve stack 30*a* consisting of PZT, PVDF (or other similar active materials) members 32*a* that function similarly to the EAP stack 30. As shown in FIGS. 3-3*b*, the recurve members 32*a* are disposed within the space 24 and stacked atop the clip 28. An internal membrane 22*a* interconnects the recurve stack 30*a* and engaging section 34 of the outer layer 22. When the door 16 is opened, the stack 30*a* is activated causing the members 32*a* to contract, thereby pulling downward the interior membrane 22*a* and engaging section 34 of the outer layer 22. Again, this causes the seal 10 to compress from a maximum unengaged height ($D_u$) to a compressed height ($D_c$). When the door 16 is closed, the stack 30*a* is released, so as to cause the engaging section 34 to push up against the door 16 as it attempts to return to its original (or deactivated) configuration. Again, it is appreciated that this increases the sealing force. Moreover, it is also appreciated that returning the seal 10 to the original configuration can be accomplished with a return mechanism (such as, the elasticity of the structure 26, a pneumatic pump, etc.), which provides a force opposite to the force provided by the active material element 20, or a two-way active material element 20 operable to return the structure via a reverse in the change in property.

Another example is shown in FIGS. 4-4*c*, wherein the seal 10 presents a triple-acting dual chamber architecture 38. Here, the compliant layer 22 again defines an uppermost arch or engaging section 34, the section 34 is connected to an upper pliable floor 40 that laterally extends across the seal 10. A lower pliable floor 42 is spaced beneath the upper floor 40 and the two floors 40,42 are interconnected by horizontally compliant side lobes 44. The floors 40, 42 and lobes 44 cooperatively define a first (or upper) chamber 46 within the space 24. A pair of vertically compliant chamber walls 48 distend below the lower floor 42 to the clip 28, and together the lower floor 42, walls 48 and clip 28 define a second (or lower) chamber 50.

Within the lower floor 42 is defined an active material based check valve 52; for example, where the floor 42 defines a through-hole 42*a* that fluidly couples the first and second chambers 46,50, the valve 52 may consists generally of an active flap, such as a PVDF bender panel. Here, the flap 52 is configured to overlay and close the through-hole 42*a* when in the straightened or deactivated condition (FIG. 4*c*), and allow air to flow into the second chamber when activated (FIGS. 4-4*b*). Finally, the active material element 20 includes at least one SMA wire or webbing 54 drivenly interconnecting the lower floor 42 and clip 28, such that when the wire 54 is caused to contract, the lower chamber 50 is compressed, thereby causing air to flow into the upper chamber 46. This pushes out the lobes 44, widening and flattening the upper chamber 46 and section 34. As a result, the sealing force is reduced.

In operation, the element 54 may be activated when the door 16 is opened, so as to push air into the upper chamber 46 and soften the seal 10 (FIG. 4*a*). Once fully activated, the flap 52 closes, holding the compressed position. After the door is closed (FIG. 4*b*), the active flap 52 is activated and the SMA wire 54 is deactivated, so as to allow air to flow back into the lower chamber 50. This increases the sealing force as the lobe stiffness forces air from the upper chamber 46; and the engaging section 34 is compressed against the door 16. When the door 16 is reopened, the seal 10 is able to achieve the original configuration shown in FIG. 4.

Figure 5:
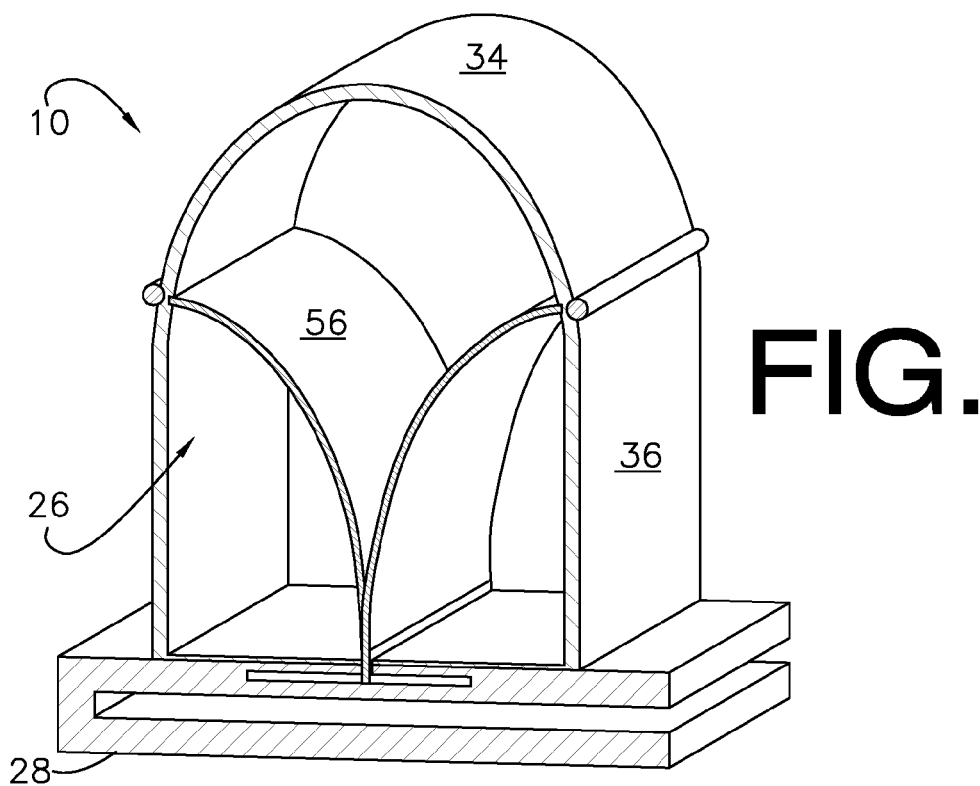
FIG. 5 is a perspective view of an active seal segment including a flexible outer layer, rigid clip, an internal structure including laterally oriented active bender arches disposed within the layer, in accordance with a preferred embodiment of the invention.
Figure 5A:
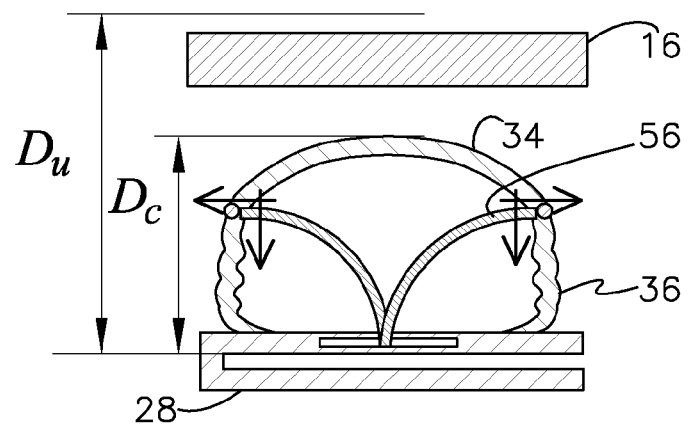
FIG. 5a is an elevation of the seal shown in FIG. 5, wherein the associated panel is opened, and the bender arches have been activated so as to collapse the layer.
Figure 5B:
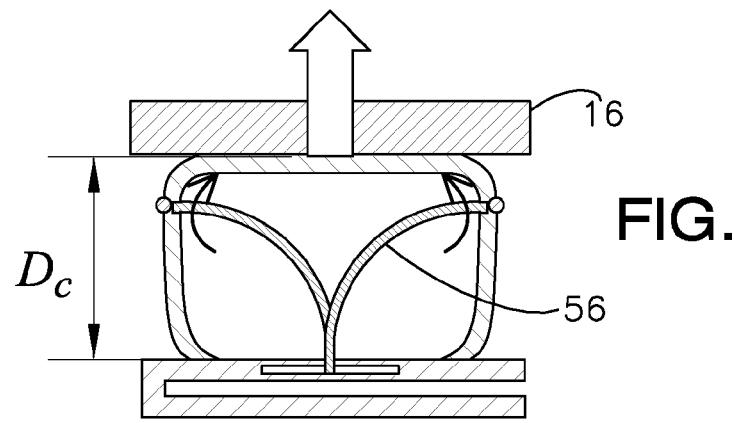
FIG. 5b is an elevation of the seal shown in FIG. 5, wherein the panel is closed, and the bender arches have been deactivated, so as to cause the layer to push against the panel.

In FIG. 5, a seal architecture is presented wherein the structure 26 includes first and second laterally oriented and elastic bender arches 56. The arches 56 are drivenly coupled to, and more preferably, integrally formed of an active material, so as to be caused to change in configuration thereby. In the illustrated embodiment, the arches 56 emanate from the clip 28 and are mirrored so as to oppositely engage the vertical walls 36 of the layer 22. The arches 56 define a first curvature when the active material is activated and a second curvature when deactivated. As shown in FIGS. 5-5b, the first and second curvatures cooperatively cause the layer 22 to achieve differing lateral configurations, wherein the seal force is varied. More particularly, and as shown in FIG. 5a, SMA bender arches 56 may be activated, when the door 16 is opened, to compress the layer walls 36 and flatten the engaging section 34 defined by the outer layer 22. Once the door 16 is closed (FIG. 5b), the bender arches 56 are deactivated or relaxed, so that the seal 10 pushes against the door 16, thereby increasing the sealing force.

Figure 6:
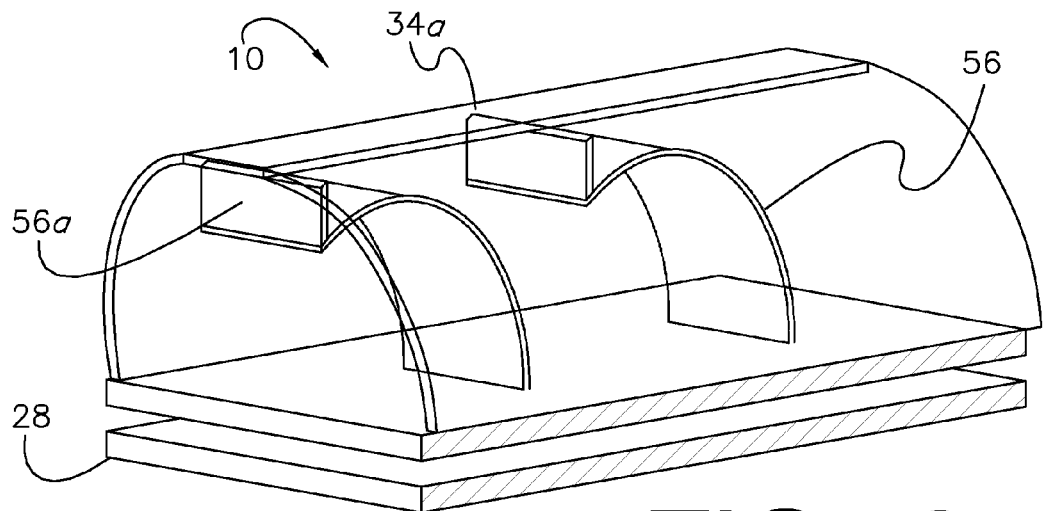
FIG. 6 is a perspective view of an active seal segment including a flexible outer layer, rigid clip, an internal structure including axially oriented active bender arches disposed within the layer, in accordance with a preferred embodiment of the invention.
Figure 6A:
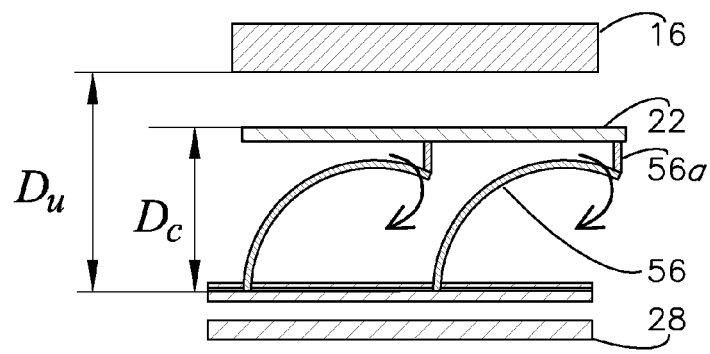
FIG. 6a is an elevation of the seal shown in FIG. 6, wherein the associated panel is opened, and the bender arches have been activated so as to collapse the layer.
Figure 6B:
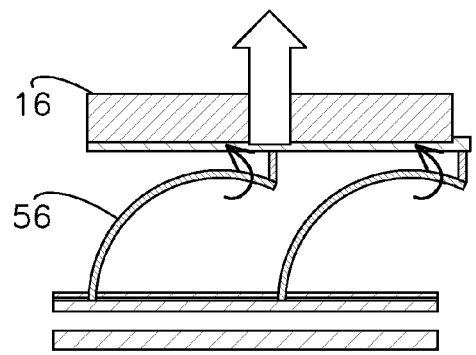
FIG. 6b is an elevation of the seal shown in FIG. 6, wherein the panel is closed, and the bender arches have been deactivated, so as to cause the layer to push against the panel.

Alternatively, and as shown in FIGS. 6-6b, the bender arches 56 may be axially (i.e., "longitudinally") orientated and present repeating configurations. Here, the arches 56 may include a vertical connecting web 56a that transmits compression to the outer layer 22 (FIG. 6). Each bender 56 is again comprised of active material and configured to present a first curvature (FIG. 6a) that exerts an upward force upon the engaging section 34 of the layer 22, when activated, and a second curvature that exerts a second upward force, when deactivated (FIG. 6b). More preferably, a reinforcement 34a may be presented along the apex of the section 34, so as to transmit the forces equally along the area of engagement (FIG. 6). In operation, when the door 16 is opened, the benders 56 may be configured and activated to present a smaller radius of curvature that causes the section 34 to flatten; and when the door 16 is closed, the constituent material is deactivated, allowing the elastic modulus of the benders 56 to exert an upward force upon the section 34, thereby resulting in increased sealing force.

In FIG. 7, the structure 26 includes a laterally extending flexible flange 58. The flange 58 is cantilevered from the clip 28 and bent, so as to define an arch, and free and fixed ends. The flange 58 is drivenly coupled to or integrally formed with an active material element 54 operable to change the degree of curvature of the flange 58 when activated and/or deactivated. For example, as shown in FIGS. 7-7b, the actuator may be an SMA wire or webbing 54, a superjacent layer of active material, or at least one SMA wire 54 drivenly coupled to a sliding plate 60. In a preferred embodiment, the seal 10 further includes an obstruction shelf 62 for self-latching capability.

As shown in FIG. 7c, when the door 16 is opened, the wire 54 remains deactivated. Closure of the door 16 causes the outer layer 22, and flange 58 to flatten, and where consisting of SMA wire as shown, the element 54 to mechanically expand (FIG. 7d). After the door 16 is closed, the wire 54 may be activated so as to pull the free end of the flange 58 towards the fixed end. This action causes the free end to slidingly engage the shelf 62 until clearing its span to achieve a latched position (FIG. 7e). The door 16 and shelf 62 cooperate to retain the flange 58 in the latched position, even if the SMA wire 54 is deactivated. Where the wire 54 is deactivated and the door 16 is opened, however, the flange 58 is able to lift the free end above the shelf height and achieve the original unlatched configuration shown in FIG. 7f.

Figure 8:
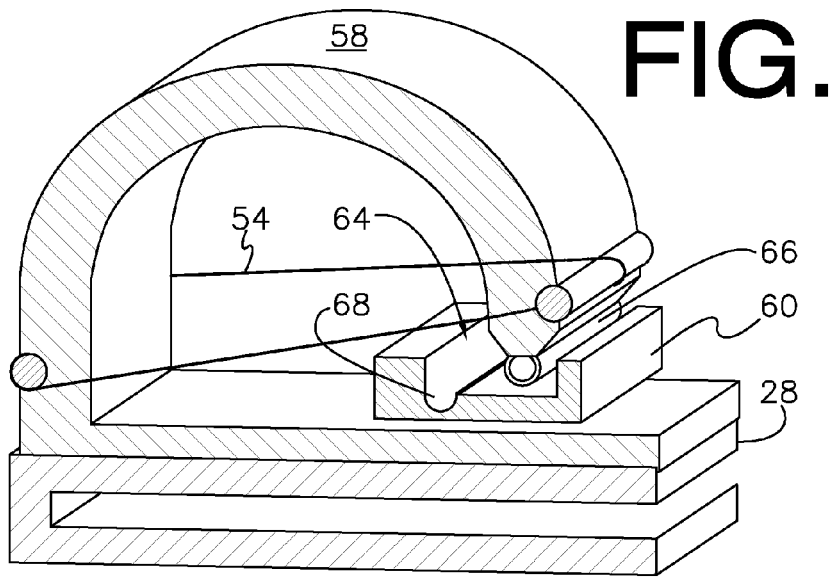
FIG. 8 is a perspective view of the inner-workings of an active seal segment including a rigid clip, an internal structure defining a latching mechanism and including a laterally cantilevered flange arch presenting a distal snap, a sliding plate defining a recess and translatably coupled to the clip, and an active material element drivenly coupled to the flange, and a panel defining a lip configured to selectively engage the plate when closed, in accordance with a preferred embodiment of the invention.
Figure 8A:
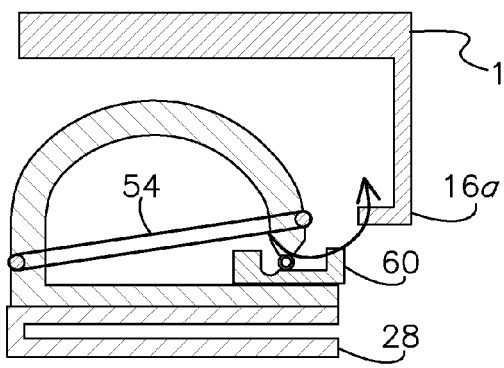
FIG. 8a is an elevation of the seal shown in FIG. 8, wherein the panel is opened, the element is deactivated, the flange presents a relaxed bowed state, and the sliding plate is in an unlatched position.
Figure 8B:
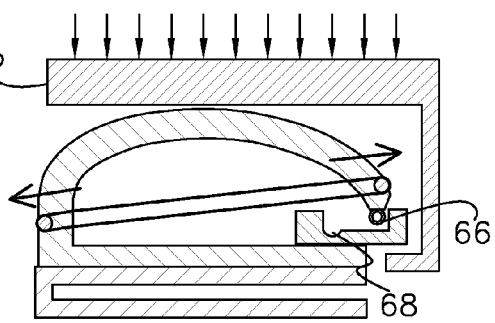
FIG. 8b is an elevation of the seal shown in FIG. 8, wherein the panel is closing and engages the seal, and the flange is caused to flatten, the element to expand, and the plate to translate outwardly so as to achieve the latched position, as a result of the panel engaging the layer.
Figure 8C:
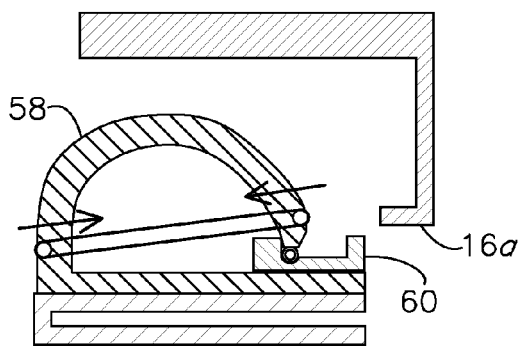
FIG. 8c is an elevation of the seal shown in FIG. 8, wherein the panel is closed, and the element has been partially activated to pull the free end of the flange inwardly, so as to cause the snap and recess to engage.
Figure 8D:
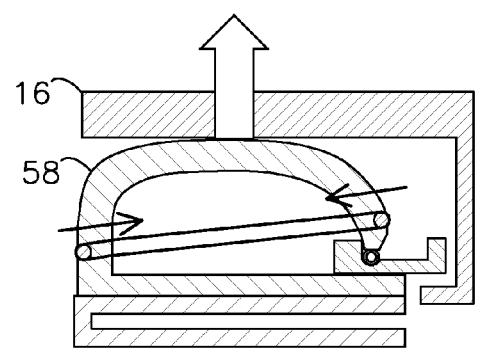
FIG. 8d is an elevation of the seal shown in FIG. 8, wherein the panel is opening, and the element has been fully activated so as to pull the free end of the flange further inward, thereby causing the plate to translate inwardly towards the unlatched position.

In FIGS. 8-8d, an alternative embodiment featuring the sliding plate 60 and latching mechanism (i.e., "latch") 64 is shown. Here, the flange 58 defines a cylindrical snap 66 at its distal or free end, and the sliding plate 60 defines a recess 68 configured to securely receive the snap 66, when the flange 58 is caused to achieve an increased sealing force position. The sliding plate 60 is able to extend past the clip 28, so a to selectively catch a lip 16a defined by the door 16. More particularly, and as shown in FIG. 8a, when the door 16 is opened, the active material element 20 (e.g., SMA wires or webbing 54) is deactivated, enabling the flange 58 to achieve its at rest bowed configuration, and the sliding plate 60 is in the unlatched position relative to the clip 28.

During door closing, the flange 58 is caused to flatten, the wires 54 to mechanically expand, and the plate 60 is pushed outward by the flange 58 to the latched position relative to the clip 28 and lip 16a. Once the door 16 is fully closed, the wires 54 are partially activated so as to cause the snap 66 to translate along the plate 60 and be inserted within the recess 68.

The flange 58 and plate 60 are cooperatively configured such that this occurs, when the distal end of the flange 58 generally perpendicularly engages the plate 60. In this configuration, the flange 58 exerts the maximum sealing force upon the door 16. Once the snap 66 is received within the recess 68. The increased sealing force will be maintained, despite deactivating the SMA wire 54. To unlatch the door 16, the wires 54 are fully actuated, so as to pull the distal end of the flange 58 inward, and therefore the plate 60 towards the fixed end until the plate 60 clears the lip 16a. As the door 16 is lifted from the seal 10, the elasticity of the flange 58 causes the snap 66 to be removed from the recess 68 and the flange 58 to return to its original configuration.

Figure 9:
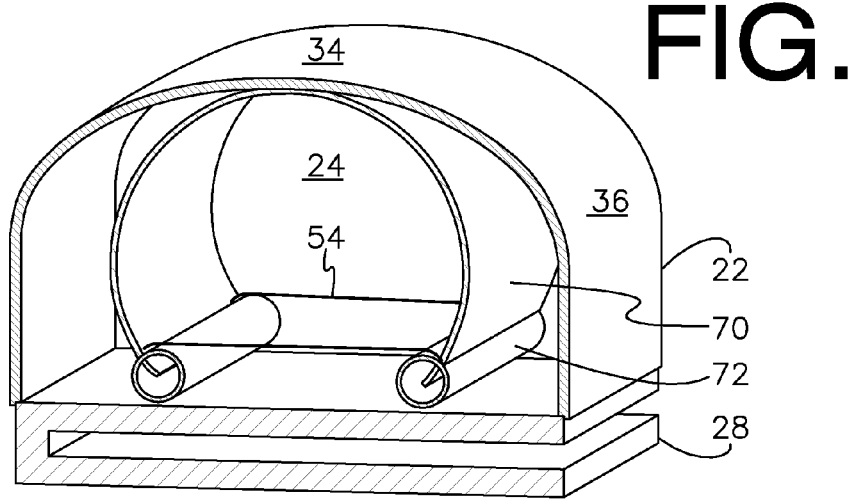
FIG. 9 is a perspective view of an active seal segment including a flexible outer layer, rigid clip, an internal structure including a bistable arch member defining free ends and a first curvature, and an active material element drivenly coupling the ends of the arch and operable to modify the curvature, in accordance with a preferred embodiment of the invention.
Figure 9A:
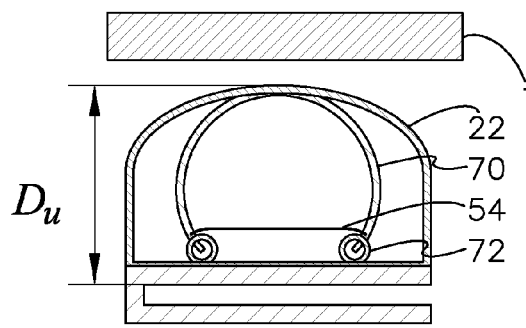
FIG. 9a is an elevation of the seal shown in FIG. 9, wherein the associated panel is opened, and the element is deactivated, so that the arch presents a relaxed bowed state.
Figure 9B:
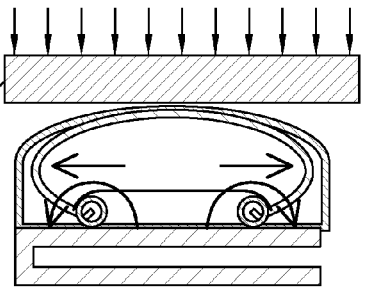
FIG. 9b is an elevation of the seal shown in FIG. 9, wherein the panel is closing and engages the seal, so that the arch is caused to flatten, and the element to mechanically expand, as a result of the panel engaging the layer.

In FIG. 9, the structure 26 generally consists of a flexible member 70 disposed within the space 24 and extending lengthwise within the seal 10. The lateral cross-section of the member 70 defines a bistable arch, wherein the distal ends of the arch are free to translate along the clip 28. The ends are coupled by an active material element, such as a plurality of SMA wires or webbing 54, so as to be caused to translate when the element is activated. To facilitate translation, the ends preferably present rotary bearings 72 or a compliant joint at the ends. More particularly, the ends are drawn towards each other, thereby causing the apex of the arch to increasingly bear upward upon the engaging section 34 defined by the layer 22. This results in greater sealing force.

Figure 9D:
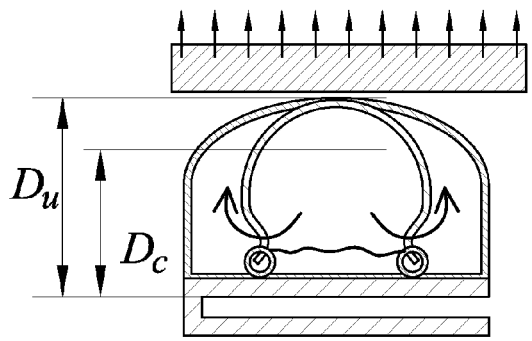
FIG. 9d is an elevation of the seal shown in FIG. 9, wherein the panel is opening, and the seal has returned to the original condition.
Figure 9C:
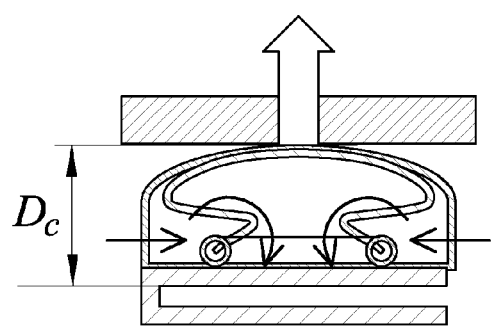
FIG. 9c is an elevation of the seal shown in FIG. 9, wherein the panel is closed, and the element has been activated so as to pull the free ends inwardly, and cause the arch to push up against the panel.

Thus, in this configuration, and as shown in FIGS. 9a-d, closing the door 16 will cause the layer 22 and member 70 to flatten, and the ends to separate, thereby mechanically expanding the SMA webbing 54. Once closed, the SMA material may be activated to cause the compliant joints to translate and the arch cross-section to attempt to present a more bowed condition. This pushes against the door 16 and effects the increased sealing force. When the door 16 is opening, the webbing 54 is deactivated, so that the compliant joints 72 are able to spring back to the default configuration (FIG. 9d).

In FIG. 10, the seal 10 generally presents a bistable double arched architecture. Here, the structure 26 includes interconnected upper, lower, and mirrored lateral members 74,76,78, each presenting an arcuate cross-section. More particularly, in the default configuration, the upper member 74 presents a bowed upward arch; the lower member 76 presents a bowed downward arch; and the lateral members 78 present bowed inward arches. As shown in FIGS. 10-10c, the lateral members 78 preferably presents topology 78a on the radially interior surface, so as to control stiffness during activation. Finally, at least one set of active material elements, such as the SMA wires 54a,b shown, interconnect the opposite upper and lower members 74,76 and the opposite lateral members 78.

In operation, when the door is opened (FIG. 10a), the vertical elements 54a may be activated so as to contract and pull the upper and lower members 74,76 inward. This causes the layer walls 36 to collapse, the lateral members 78 to become bowed outward thereby mechanically stretching the horizontal wires 54b, and the lower arched member 76 to become bowed inward, thereby achieving the second stable position. While the door 16 is being closed, the seal 10 maintains its compressed configuration thereby resulting in reduced seal force and a facilitated task. Once the door is closed, the vertical SMA wires 54a is deactivated, and the horizontal wires 54b are activated, so as to pull the lateral members 78 inward (FIG. 10b). This drives the upper and lower members 74,76 outward (i.e., away from the center line of the space 24) so as to push against the door 16 and clip 28, thereby resulting in greater sealing force. Here, it is appreciated that the lateral members 78 achieve the second stable positions, and as such, will remain inwardly bowed even when the horizontal wires 54b are deactivated.

In FIGS. 11-11c, the structure 26 may include a fixed electrode 80, and a selectively engaged bender actuator (i.e., "bender") 82 that emanates from the clip 28. The fixed electrode 80 is preferably connected to the engaging section 34 of the outer layer 22 and distends vertically therefrom. The electrode 80 defines an "L" shaped configuration that includes a generally vertical section 80a, and a traverse section 80b extending generally orthogonally therefrom. The bender 82 presents an inverted "L"-shaped longitudinal cross-section also consisting of a generally vertical section 82a, and a traverse section 82b extending generally orthogonally therefrom. The vertical section 82a of the bender 82 preferably comprises active material, so as to be caused to achieve first and second longitudinal configurations (e.g., straight (FIG. 11b) and bent (FIG. 11a)).

The electrode 80 and bender 82 are cooperatively positioned, such that when the bender 82 is deactivated the corresponding traverse sections 80b,82b, overlap. When the bender 82 is activated, the traverse sections 80b,82b clear each other, so as to allow relative movement. To that end, the structure 26 further includes at least one active material element 20, such as SMA wires or webbing 54, that is drivenly coupled to the electrode 80.

As shown in FIGS. 11a-c, the SMA wires 54 vertically interconnect the electrode 80 and clip 28, such that when the wires 54 are activated and caused to contract (and the bender 82 is in the bent configuration), the electrode 80 and engaging section 34 are caused to translate downward. This results in a reduced sealing force as the layer 22 achieves a flattened configuration. The electrode 80 is caused to translate so that its traverse section 80b clears the traverse section 82b of the bender 82. In this configuration, the bender 82 may be deactivated so that the vertical section 82a straightens and the traverse section 82b catches the traverse section 80a of the electrode 80, preventing the electrode 80 and layer 22 from returning to the original condition even when the wires 54 are deactivated. Once the door 16 is closed, the latch 64 is released, by activating the bender 82, so that the elastic modulus of the layer 22 is able to push against the door 16, thereby increasing the sealing force.

Figure 12:
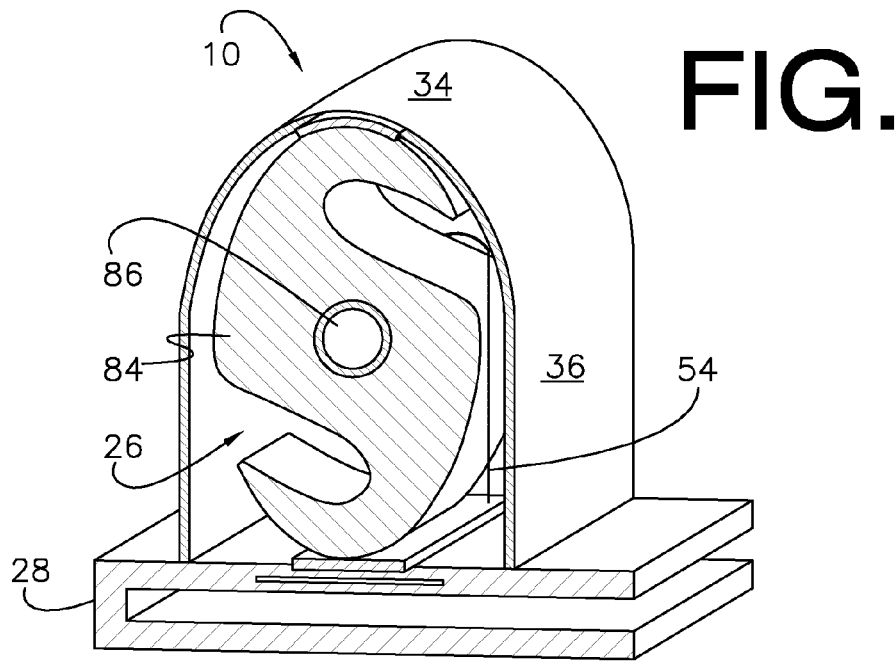
FIG. 12 is a perspective view of an active seal segment including a flexible outer layer, rigid clip, an internal structure including an "S"-shaped cam, spool, and at least one element drivenly coupled to the spool, in accordance with a preferred embodiment of the invention.
Figure 12A:
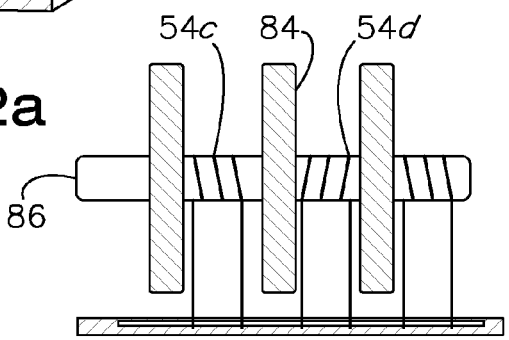
FIG. 12a is an elevation of the seal shown in FIG. 12, particularly illustrating the spool, and pluralities of cams and elements, in accordance with a preferred embodiment of the invention.
Figure 12B:
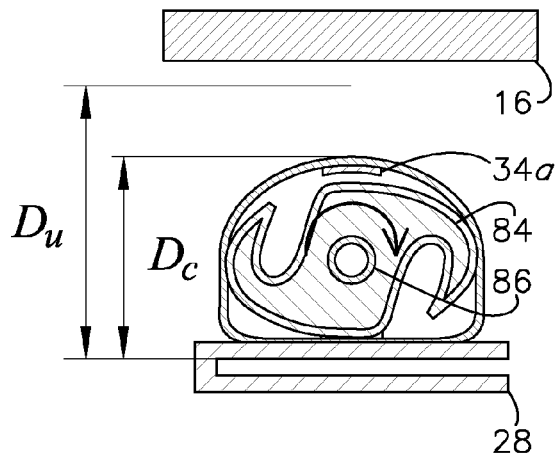
FIG. 12b is an elevation of the seal shown in FIG. 12, wherein the associated panel is opened, and at least a portion of the elements have been activated, so as to cause the cam to be rotated to the horizontal orientation and the layer to flatten.
Figure 12C:
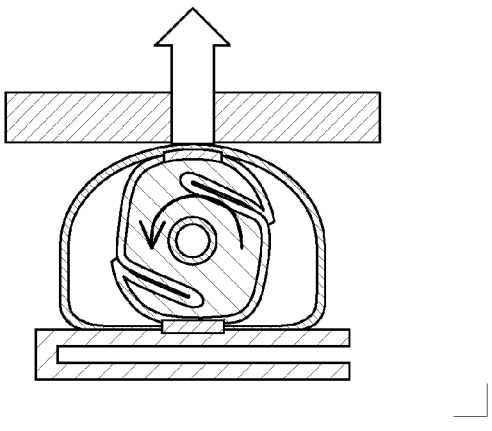
FIG. 12c is an elevation of the seal shown in FIG. 12, wherein the panel is closed, and the cam has been caused to return to the vertical orientation, so as to push up against the panel.
Figure 13:
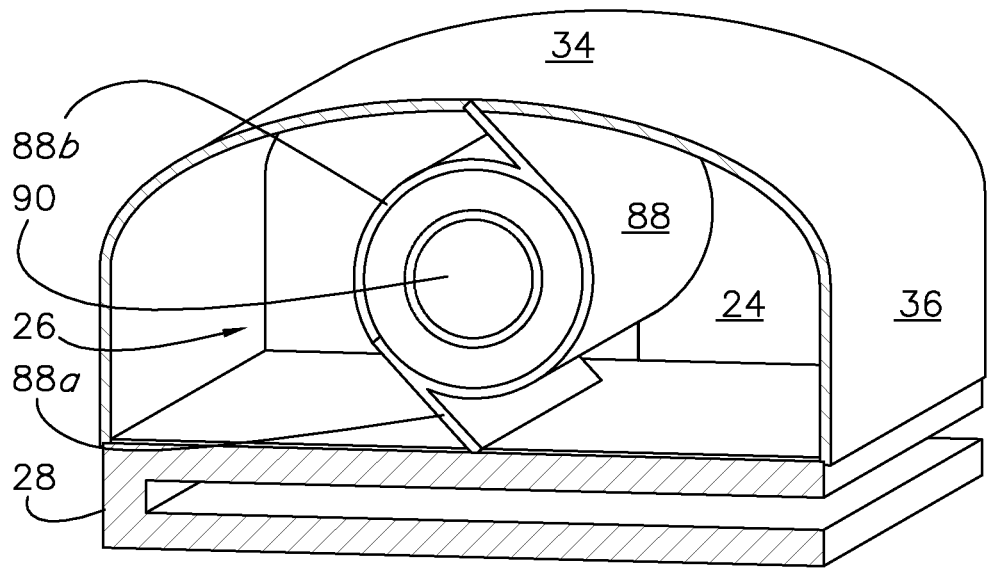
FIG. 13 is a perspective view of an active seal segment including a flexible outer layer, rigid clip, an internal structure including a torsional membrane, and an active core actuator drivenly coupled to the membrane, in accordance with a preferred embodiment of the invention.
Figure 13A:
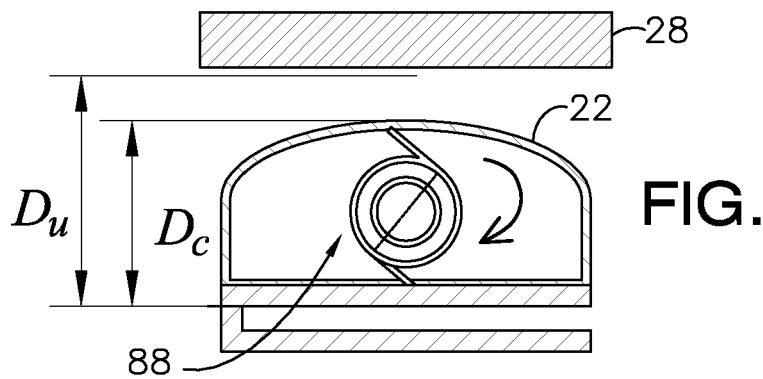
FIG. 13a is an elevation of the seal shown in FIG. 13, wherein the associated panel is opened, and the actuator has been activated, so as to cause the membrane to rotate to a shorter height and the layer to flatten.
Figure 13B:
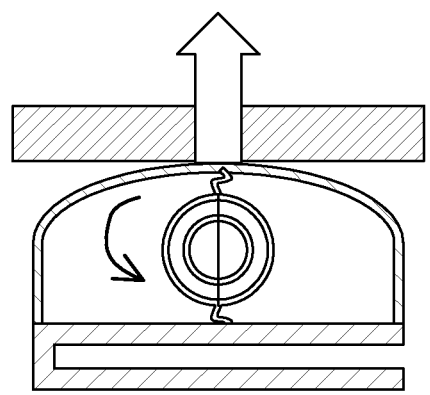
FIG. 13b is an elevation of the seal shown in FIG. 13, wherein the panel is closed, and the actuator deactivated, so that the membrane attempts to return to the original configuration, and in doing so, pushes up against the panel.

In other embodiments, shown in FIGS. 12-13b, the active material element 20 is operable to cause at least a portion of the structure 26 to rotate, and the rotation of the structure 26 varies the sealing force. In FIGS. 12-12c, for example, the structure 26 includes an "S"-shaped cam 84 preferably formed of high-stiffness rubber. The cam 84 is concentrically aligned with a spool 86 and at least one SMA wire 54 is wound around the spool 86. It is appreciated that the seal 10 includes pluralities of cams 84 and wires 54 that engage the spool 86 in series (FIG. 12a). More preferably, the wires 54 are wound in alternating directions, so as to effect opposites directions of rotation when activated. The cams 84 are spaced such that sufficient contact between the outer layer 22 and door 16 is maintained. More preferably, a reinforcement 34a may be presented along the apex of the engagement section, 34 so as to transmit the forces equally along the area of engagement (FIG. 12b).

As shown in FIGS. 12 and 12b, the cam 84 is rotatable by the wires 54 between a generally vertical orientation that pushes the engaging section 34 of the layer 22 upward, and a generally horizontal orientation that causes the layer 22 to flatten. When the door 16 is opened, the cam 84 is caused to achieve the horizontal condition, so as to facilitate closing. Once the door 16 is closed (FIG. 12b), the first set of wires 54c is deactivated, and the second set of wires 54d are activated to cause the cam 84 to rotate to the vertical condition. This compresses and causes the cam 84 to push outward against the engaging section 34 and clip 28, thereby increasing the sealing force.

In another rotary embodiment, the cams 84 are replaced by a torsional membrane 88 (FIGS. 13-13b) defining upper and lower wings 88a and a core 88b that interconnect the engaging section 34 of the layer 22 and clip 28. The membrane 88 may be segmented or continuous along the longitudinal profile of the seal 10. In the illustrated embodiment, an actuator 90 is disposed within the core 88b, and comprises the active material element 20. The actuator 90 is configured to effect rotational displacement, and as such may present an SMA torque tube, etc. As shown in FIG. 13a, when the active material is activated, the membrane 88 is caused to rotate in a first direction (dependent upon the orientation of the wings 88a), which causes the membrane 88 to decrease in height and the layer 22 to flatten, thereby facilitating door closure. Once the door 16 is closed, actuation may be terminated, so that the configuration and elasticity of the membrane 88 can act to return the membrane 88 to the original (or deactivated) condition. As such, the membrane 88 is caused to push against the door 16 resulting in greater sealing force.

Finally, in general operation, it is appreciated that the active material element 20 is preferably able to be autonomously activated, upon the occurrence of a condition (or event). As such, the preferred seal 10 is communicatively coupled to a controller 92 and at least one sensor 94 (FIG. 1) operable to determine the condition. When the condition stops (e.g., the door is opened, unlocked, etc.), the active material element 20 can be deactivated and/or where applicable the latch 64 disengaged, so that the seal 10 is able to return to the default condition. The process may be repeated throughout the life of the seal 10.

For example, the condition may be a door closing or opening event. Here, the sealing force is autonomously increased when the sensor 94 detects that the door 16 has been closed, and autonomously decreased when the door 16 is opened. The decreased sealing force configuration may be maintained as long as the door 16 is kept open, or relaxed back to the increased force configuration after a timeout period has expired while the door 16 is opened. In the latter scenario, it is appreciated that the controller 92 includes a timer 92a, the sensor 94 is operable to determine the motion of the door 16 during a closing event, and the seal architecture is able to rapidly effect the decreased sealing force configuration (prior to the door reaching the closed condition). In a second example, the condition may be a door locking or unlocking event, wherein the sealing force is increased when it is determined that the door 16 is locked (and presumably closed). Lastly, in a third example, pulling or releasing the door handle 96 may trigger activation. Here, the sealing force may be decreased when the handle 96 is pulled (and the door 16 is closed and unlocked); and increased, when the handle 96 is released or when the door is locked. It is appreciated that a relatively brief period between pulling the handle 96 and the door opening is likely to occur, and as such, transition to the reduced sealing force configuration is preferably a rapid response.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An active seal strip producing a variable sealing force, the seal strip being adapted for placement on a vehicle opening structure defining a vehicle opening perimeter in a vehicle body in which a vehicle closure panel is configured to engage the perimeter of the vehicle opening structure so as to close the opening, the active seal strip being adapted to produce a variable sealing force between the vehicle opening structure and the vehicle closure panel, the active seal strip comprising:
  a mounting clip for placement of the active seal strip on the perimeter of the vehicle opening structure, the clip comprising a support surface; and
  a flexible, hollow member fixedly connected to the clip support surface, the flexible hollow member having two, lateral, substantially parallel, flexible walls directly connected to and extending from the mounting clip, the walls each having a length and being substantially perpendicular to the clip support surface, the hollow member further having a flexible top surface connecting the walls and defining an interior space, the flexible hollow member having a length and extending longitudinally along the perimeter of a vehicle body opening, the top surface of the flexible, hollow member being adapted to be engaged in a sealing mode by the vehicle closure panel when the vehicle closure panel is moved to a closed position, the flexible top surface then being compressed toward the mounting clip and the substantially parallel, flexible walls cooperating with the flexible top surface by expanding laterally into opposing, outwardly-bowed configurations with respect to the longitudinal path of the seal along the perimeter of the vehicle body opening, such compression providing a sealing force between the vehicle closure panel and the flexible hollow member; and
  an interior structure located within the flexible, hollow member and extending along the length of the flexible, hollow member, the interior structure comprising one or more active material elements transitionable between an activated and a deactivated state, each active material element, in its activated state, expanding and outwardly bowing the lateral walls of the hollow member and lowering the top surface of the hollow member for reduced sealing force and, in its deactivated state, permitting the top surface of the hollow member to rise to engage the vehicle closure panel with increased sealing force and enable the lateral walls of the hollow member to contract inwardly, wherein the two substantially parallel, flexible walls are substantially perpendicular to the clip support surface along the entire length of each substantially parallel, flexible wall when the one or more active material element are in their deactivated state.

2. The active seal strip as claimed in claim 1, wherein the interior structure includes a plurality of active material elements stacked in face-to-face relationship, and each active element material is formed of material selected from the group consisting of electroactive polymers, piezoelectric materials, and thin films of composites formed between poly (vinylidene fluoride) and lead zirconium titanate and the stacked elements are arranged and adapted to laterally expand the substantially parallel, felxible walls when activated.

3. The active seal strip as claimed in claim 1, wherein the interior structure includes at least one cantilevered arch extending upwardly from the clip and presenting a first curvature and reduced sealing force when the one or more active material elements are activated and a second curvature and increased sealing force when the one or more active material elements are deactivated.

4. The active seal strip as claimed in claim 3, wherein the seal strip comprises first and second laterally extending and mirrored arches comprising the one or more active material elements, and each arch extends from the clip to engage a respective substantially parallel, flexible wall.

5. The active seal strip as claimed in claim 3, wherein the structure includes a plurality of axially oriented arches.

6. The active seal strip as claimed in claim 1, wherein the structure presents a bistable configuration.

7. The active seal strip as claimed in claim 1, further comprising:
  a controller communicatively coupled to the one or more active material element; and
  a sensor communicatively coupled to the controller and operable to detect a first condition, said controller and sensor being cooperatively configured to activate the one or more active material elements, when the condition is detected.

8. The active seal strip as claimed in claim 7, wherein the condition is a door opening or closing event.

9. The active seal strip as claimed in claim 7, wherein the condition is a door locking or unlocking event.

10. The active seal strip as claimed in claim 7, wherein the condition is a handle pulling or releasing event.

11. The active seal strip as claimed in claim 7, wherein the controller further includes a timer, and the one or more active material element is activated when a period elapses after the condition is detected.

12. The active seal strip as claimed in claim 1 in which the active material element is connected to the flexible top surface.

13. The active seal strip as claimed in claim 1 in which the one or more active material elements are connected to one or both of the substantially parallel, flexible walls.

14. The active seal strip as claimed in claim 1 in which the flexible hollow member has an interior surface and the interior structure is adapted to lower and raise the top surface of the hollow member by selectively contacting one or more suitable regions of the interior surface.

15. The active seal strip as claimed in claim 1 in which the flexible hollow member has an interior volume divided into two more chambers, the chambers extending along the length of the seal.

* * * * *